March 6, 1934.  G. M. HARTSOCK  1,950,110
TRANSMISSION
Filed April 23, 1931  2 Sheets-Sheet 1

INVENTOR.
Guy M. Hartsock
BY
ATTORNEY.

March 6, 1934.   G. M. HARTSOCK   1,950,110
TRANSMISSION
Filed April 23, 1931   2 Sheets-Sheet 2
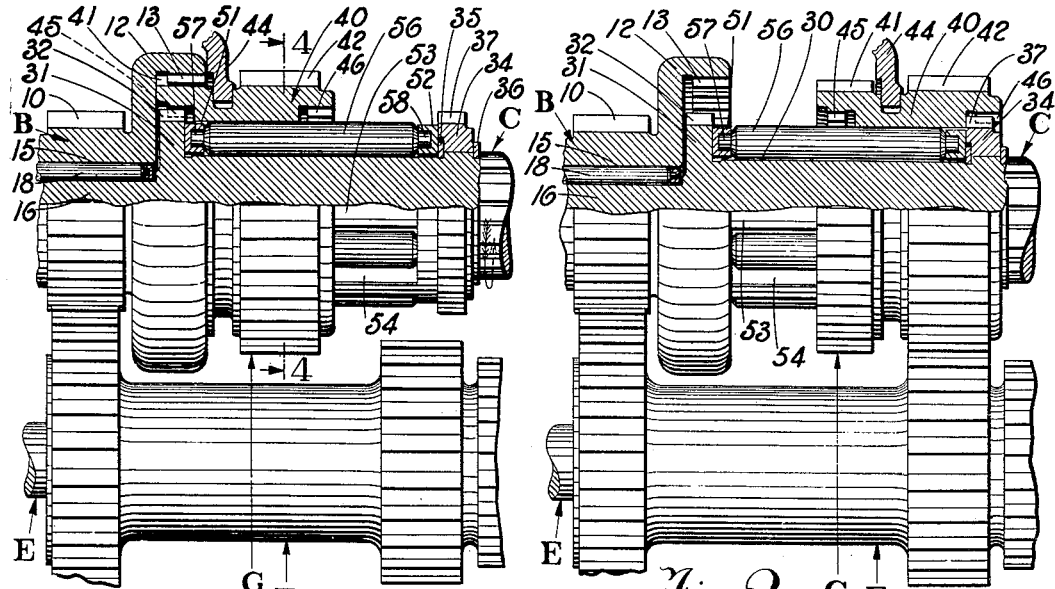
Fig. 3   Fig. 2
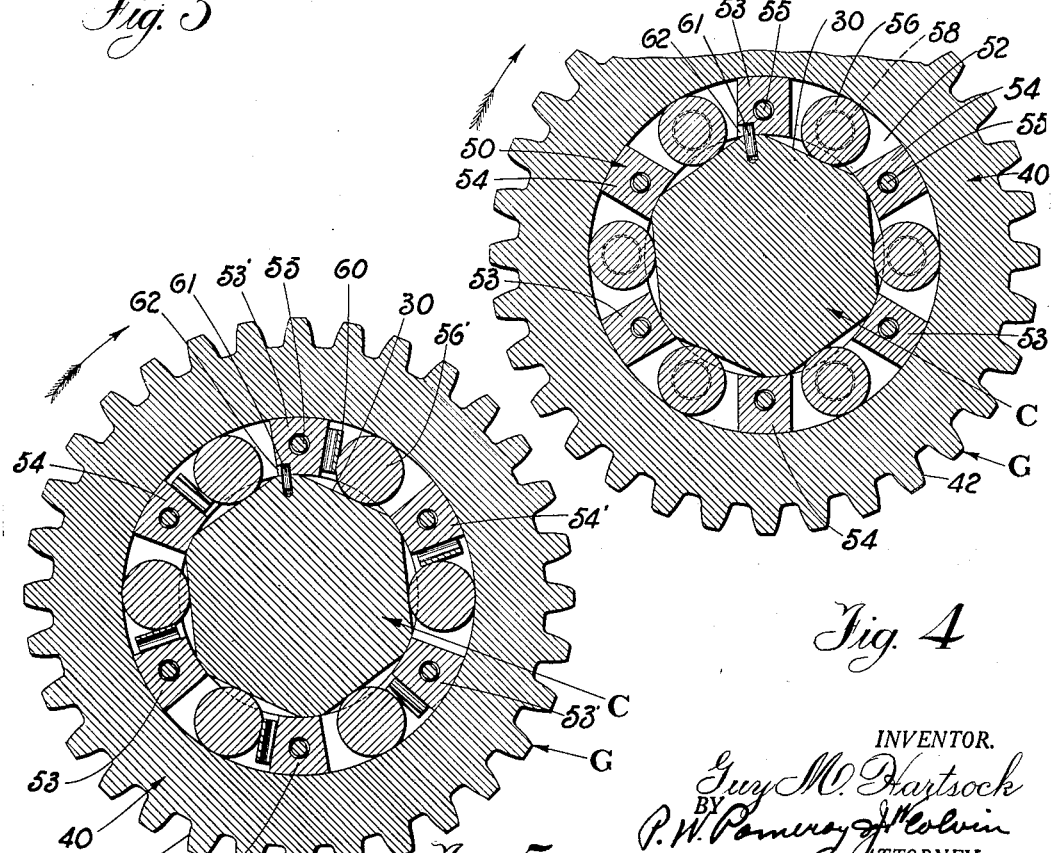
Fig. 4
Fig. 5
INVENTOR.
Guy M. Hartsock
BY
P. W. Pomeroy & Colvin
ATTORNEY.

Patented Mar. 6, 1934

1,950,110

UNITED STATES PATENT OFFICE

1,950,110

TRANSMISSION

Guy M. Hartsock, Detroit, Mich., assignor, by mesne assignments, to Free Wheeling Patents Corporation, South Bend, Ind., a corporation of Delaware Application April 23, 1931, Serial No. 532,172

18 Claims. (Cl. 74—57)

This invention relates to improvements in variable speed transmissions and deals more specifically with transmissions especially designed for use in motor vehicles.

The primary object of the invention is to provide a transmission for motor vehicles whereby the operator of the vehicle may be enabled to select different speed ratios between the engine and the propeller shaft in a forward direction, and by means of which the operator may be enabled to select a speed ratio for propelling said vehicle in a reverse direction, the transmission being especially designed to permit the driven shaft of the mechanism to overrun or exceed the speed of rotation of the drive shaft when the transmission is set for certain forward speeds to thereby provide for free wheeling.

The term "free wheeling" is used to apply to that condition in the operation of a motor vehicle whereby the speed of the vehicle is permitted to become greater than the speed of the motor without manipulation or the main vehicle clutch. This condition is accomplished by providing within the transmission of the vehicle an overrunning or one-way acting clutch element.

A great many advantages flow from the provision of free wheeling in motor vehicles, probably the most outstanding of which are, reduced fuel and oil consumption, less wear on the engine and transmission, increased driving safety and greater ease of vehicle control.

A further object of the invention is to provide a transmission of the above mentioned type wherein the overrunning or free wheeling may be permitted or prevented at the will of the operator.

A specific object of the invention is to provide an improved mechanism for accomplishing overrunning or free wheeling at certain settings of the transmission.

A still further object of the invention is to provide a novel, simple and economical construction of a variable speed transmission embodying all the above referred to advantages.

Other objects and advantages of the invention will be apparent through the course of the following description:

In the accompanying drawings forming a part of this specification and in which like numerals are employed to designate like parts throughout the several views, Figure 1 is a vertical sectional view of the variable speed transmission, embodying this invention, certain of the parts being broken away to more clearly illustrate the invention.

Figure 2 is a vertical side elevational view of the free wheeling or over-running clutch element in positive intermediate or second speed position, certain parts being broken away to show the internal structure thereof.

Figure 3 is a view similar to Figure 2 showing the free wheeling or over-running clutch element in positive high or third speed operative position.

Figure 4 is a transverse sectional view taken on the line 4—4 of Figure 3.

Figure 5 is a similar view to Figure 4 but showing a somewhat modified form of the device.

Figure 1:
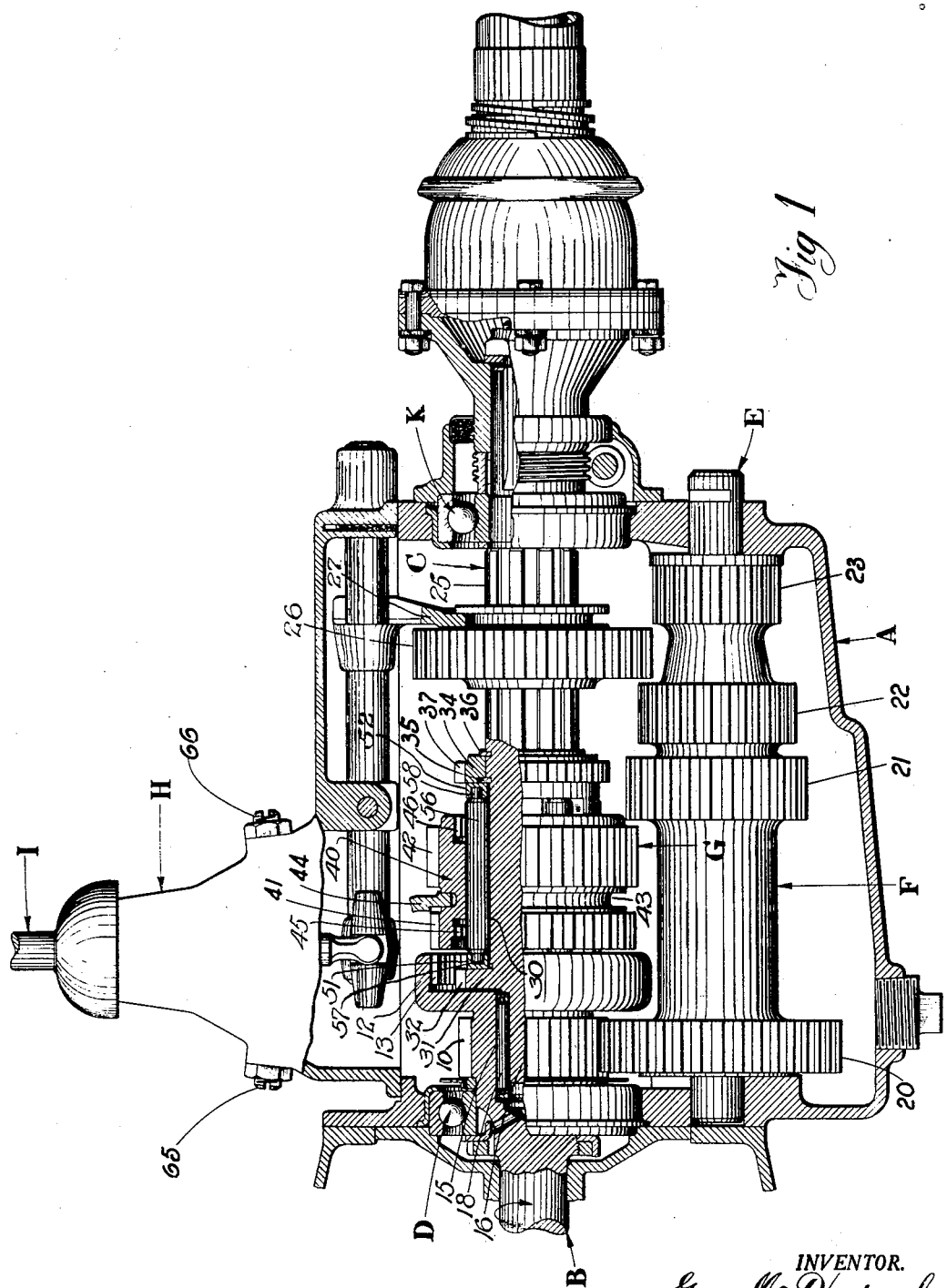

The variable speed transmission mechanism embodying this invention will now be briefly described to enable those skilled in the art to quickly arrive at an understanding of the construction and mode of operation of the same.

The transmission includes a housing or casing A in which is mounted a drive shaft B, a driven shaft C and a countershaft E. The drive shaft B and driven shaft C are arranged in axial alignment with each other and are supported in the housing A by means of the anti-friction bearings D and K. The end of the drive shaft B which projects within the transmission housing A is provided with external gear teeth 10 and beyond the gear teeth 10, the shaft is enlarged to form a concentric ring 12 internally of which are clutch teeth 13. Interiorly of the gear teeth 10 the shaft B is formed with an internal recess 15 within which is telescopically inserted the reduced end 16 of the driven shaft C. Between the reduced end 16 of the driven shaft C and the annular wall of the recess 15, there is provided an anti-friction bearing 18. Mounted upon the countershaft E is a sleeve member F which has formed thereon gears 20, 21, 22 and 23, the gears 21, 22 and 23 being of different diameters to provide for different speed ratios between the drive shaft B and the driven shaft C. The gear teeth 10 of the shaft B are constantly in mesh with the teeth on the gear 20 so that the sleeve F rotates at all times when the transmission is in operation.

The rearward portion of the driven shaft C is splined as at 25 and slidably mounted upon this splined portion is a gear 26 adapted to be shifted axially of the driven shaft C by means of the shifting fork 27 into meshing relation with the gear 22 or into meshing relation with an idler pinion (not shown) which is constantly meshed with the gear 23 to provide first and reverse speeds in the usual manner. Formed upon the forward end of the driven shaft C is a cam section 30 as shown in Figures 4 and 5. The cam section illustrated in this particular adaptation of the invention is in the form of an hexagonal section, the corners of which are somewhat rounded. Between the cam section 30 and the reduced portion 16 of the driven shaft C there is provided an integral annular flange 31, having formed peripherally thereof clutch teeth 32 and at the opposite end of the cam section 30 a collar 34 is mounted upon the splined portion 25 and is restrained from axial motion relative to the driven shaft by snap rings 35 and 36 and has formed peripherally thereon clutch teeth 37. Surrounding the cam section 30 is a sleeve member generally designated as 40, the interior diameter of which is greater than the maximum diameter of the cam portion 30 for a purpose that will appear hereafter in the description.

Formed exteriorly upon the sleeve member 40 is a set of clutch teeth 41, a set of gear teeth 42 and a groove 43 for the shifter fork 44. Interiorly of the sleeve member are sets of clutch teeth 45 and 46 provided at the opposite ends of the sleeve member and adapted to mesh with the clutch teeth 32 and 37 respectively.

A device generally indicated at 50 is carried by the cam section 30 between the cam section and the inner surface of the sleeve 40. In the preferred form illustrated in Figure 4 this mechanism comprises, a pair of ring members 51 and 52, bar members 53 and 54, dowel pins 55, and rollers 56, the ring and bar members constituting a cage to carry the rollers. The bar members 53 are integral at one end with the ring 51 and the bar members 54 are integral at one end with the ring 52 as shown in Figure 3. The dowel pins are inserted in bores in the rings and bar members to restrain the rings from rotation relative to each other. The rollers have reduced ends 57 and 58 inserted in bearing recesses formed in the rings 51 and 52 respectively, one roller being inserted between each two adjacent bar members.

In order to assemble this device; the rings 51 and 52 with their integral bars 53 and 54, are placed upon the shaft C somewhat spaced apart from their operative position. The rollers 56 are then placed in the spaces between the bars 53 and 54 and the rings pressed together so that the reduced ends of the rollers project into the bearing recesses in the rings. The dowel pins 55 are then inserted in the bores in the rings and bar members and the sleeve 40 is slid on the shaft and over the rollers. The snap ring 35 is positioned, the collar 34 slid upon the shaft against the snap ring 35, and the snap ring 36 positioned to retain the device in assembled relation.

In the modification shown in Figure 5, the ends of the roller members 56' are not journaled in the ring members but each bar member 53' or 54' is provided with a spring actuated guide member 60 which functions to press the rollers up into engagement with the surface of the cam section 30 and the inner cylindrical surface of the sleeve member 40. In this form of the invention the dowel pins may be inserted through the rings and bar members and then riveted at the ends to form a cage that may be placed upon the shaft as a unit. After the unitary cage is placed upon the shaft the rollers are inserted in place and the sleeve 40 and collar 34 mounted as described above. In both forms of the invention there is mounted on the cam section 30 a stop member 61 which projects into a slot 62 in one of the bar members, the object of this stop member 61 being to prevent rotation of the cage comprising the bars 53 and 54 and rings 51 and 52 in one direction relative to the cam section 30.

Referring to Figure 4, it has been shown that the cam section 30 is a flat sided polygon and is so formed that if a radius be drawn from the center of the cam section 30 through the center of the roller 56 when the roller is in position to contact both the cam member and the inner surface of the sleeve member 40, the flat surface of the cam member will not intersect the radius at right angles but will have a slightly greater angle on the forward side of the radius than on the rearward side thereof. The purpose of this construction is to give a wedging relation between the surface of the cam member and the inner surface of the sleeve member so that the roller 56 will wedge between these two members and thereby prevent relative rotation thereof in one direction. Upon an initial relative rotation in the opposite direction, the roller will be rolled back out of wedging relation between the two members but as the stop member 61 prevents the roller from being rolled into wedging relation at the opposite edge of the flat portion of the cam section 30, relative rotation of the members 30 and 40 in this direction will be permitted.

It will be noted that the transmission housing A is provided with a cover H which supports a gear shift lever I and two stop members 65 and 66 opposite the lower end of the shift lever I.

The operation of the device is as follows:

As explained above, first and reverse speeds are accomplished in the usual manner by shifting the gear 26 along the splined portion of the shaft C into engagement with the gear 22 or idler pinion (not shown) in the usual manner. In order to accomplish second speed, the sleeve 40 is shifted by means of the shift lever I acting through the fork 44 until the gear teeth 42 on the sleeve are in mesh with the teeth of the gear 21. In this position of the parts, the power will be transmitted from the drive shaft B through the gear teeth 10, to the gear 20 on the sleeve F, to the gear 21 and from the gear 21 to the gear 42 on the sleeve member 40. Rotation of the sleeve member in the direction for transmitting power from the drive shaft B to the driven shaft C will roll the rollers 56 into wedging relation between the flat surfaces of the cam section 30 and the inner surface of the sleeve member 40, thereby transmitting the power from the sleeve member 40 to the driven shaft C. In this position, if the speed of the driven shaft C, for any reason, exceeds the speed of the drive shaft B, the rollers 56 will be moved back, out of wedging relation and maintained in a free position by the stop member 61 whereby the sleeve 40 is permitted to rotate relative to the cam section 30, thereby giving the free wheeling or overrunning function of the clutch element G.

If it be desired to eliminate or lock-out this free wheeling or overrunning function, an extention on the lower end of the gear shift lever I is depressed below the inner end of the stop member 66, permitting an over shift of the gear shift lever I which moves the sleeve member 40 a further distance in the direction of shifting so that the clutch teeth 46 on the sleeve member 40 engage with the clutch teeth 37 on the collar 34 thereby non-rotatably locking the sleeve 40 to the driven shaft C. In this position of the parts, the power is transmitted from the drive shaft B through the gear teeth 10 and the gear 20 to sleeve F, and from gear 21 on sleeve F through the gear teeth 42, to the sleeve 40 and through the clutch teeth 46 and 37 to the driven shaft C, providing a positive two-way transmission of power between the engine and the driven shaft.

In order to accomplish third speed drive, the sleeve 40 is shifted along the rollers 56 by means of the gear shift lever I and fork 44 until the clutch teeth 41 on the sleeve 40 mesh with the clutch teeth 13 formed interiorly of the ring 12 which is an integral enlargement of the shaft B. In this position of the parts, power is transmitted from the drive shaft B through the clutch teeth 13, to the clutch teeth 41 on the sleeve member 40. The overrunning clutch mechanism G will now transfer the power to the driven shaft C and permit the driven shaft C to overrun the drive shaft B under its own momentum as described above.

In order to eliminate or lock-out this free wheeling or overrunning function in high or direct speed, the extension on the lower end of the gear shift lever I is depressed below the inner end of the stop 65, permitting an over shift of the gear shift lever I and a second further motion of the sleeve 40 in the direction of shifting so that the clutch teeth 45 on the sleeve 40 become meshed with the clutch teeth 32 on the annular flange 31 formed integrally on the driven shaft C.

In this position of the parts, the power is transmitted from the drive shaft B to the clutch teeth 13 and 41 and clutch teeth 45 and 32, thereby forming a direct positive drive between the drive and driven shafts.

It is to be understood that the form of this invention herewith shown and described is illustrative only and to be taken as an example of the same and that formal changes and changes in the shape, size and arrangement of parts may be resorted without departing from the spirit of the invention or the scope of the sub-joined claims.

Having thus described my invention, I claim:

1. In a transmission mechanism, a driving member having clutch teeth formed thereon and a driven member, means to provide a one-way driving connection between said members comprising, a cam surface formed on said driven member, a sleeve surrounding said cam surface having clutch teeth formed thereon selectively operatively engageable with said clutch teeth on said driving member, and rollers mounted against axial displacement between said cam surface and said sleeve to wedge therebetween when power is applied to said sleeve.

2. A motor vehicle drive comprising, drive and driven members, one of said members having a cam surface and clutch teeth formed thereon, rollers mounted against axial movement on said cam surface, a sleeve slidably mounted directly on said rollers adapted to roll said rollers into and out of wedging relation between said sleeve and said cam surface, and means for sliding said sleeve into operative engagement with said other member to provide a one-way driving connection between said members and to slide said sleeve further into engagement with said clutch teeth to provide a two-way driving connection between said members.

3. In a vehicle transmission having drive and driven shafts and shiftable change-speed gears, a cam surface formed on one of said shafts, and rollers mounted against axial movement on said cam surface, one of said change-speed gears being slidably mounted directly on said rollers and adapted to engage with means on said other shaft whereby said rollers will move into and out of wedging position on said cam surface to provide a one-way drive for said transmission.

4. In a vehicle transmission having drive and driven shafts and change-speed gears shiftable on one of said shafts to selectively provide different speed ratios between said shafts, an overrunning clutch to provide a one-way drive between said shafts when one of said shiftable gears is moved to an operative position comprising, a cam surface on said one shaft, and a plurality of wedging rollers mounted against axial movement between said cam surface and said change-speed gear.

5. In a vehicle transmission having drive and driven shafts and change-speed gears slidably mounted on one of said shafts, means to provide a one-way and a two-way drive between said shafts comprising, a cam surface and clutch teeth on said one shaft, and a plurality of rollers mounted against axial movement on said cam surface, one of said change-speed gears being slidable on said rollers to engage said other shaft to provide a one-way drive between said shafts and clutch teeth formed interiorly of said gear engageable with the clutch teeth on said shaft, said gear being further slidable to cause the clutch teeth therein to engage the clutch teeth on said shaft to provide a two-way drive between said shafts.

6. In a vehicle transmission having drive and driven shafts and change-speed gears mounted on one of said shafts, means to provide a one-way and a two-way drive between said shafts comprising, a cam surface and spaced sets of clutch teeth on said one shaft and a plurality of rollers mounted against axial movement on said cam surface between said sets of clutch teeth, one of said change-speed gears being slidable on said rollers in either direction to operatively engage said other shaft to provide a one-way drive between said shafts spaced sets of clutch teeth formed interiorly of said gear engageable with the clutch teeth on said shaft, said gear being further slidable in the same direction to cause one set of clutch teeth therein to engage the respective set of clutch teeth on said shaft to provide a two-way drive between said shafts.

7. In a vehicle transmission, a pair of aligned shafts, and an overrunning clutch mechanism on one of said shafts operatively engageable with the other of said shafts to provide a one-way driving connection between said shafts, said clutch comprising, a polygonal section formed integrally on said one shaft, a pair of rings mounted on said one shaft, one at each end of said polygonal section, bars extending between said rings, rollers inserted between said bars, and a sleeve slidable on said rollers and operatively engageable with said other shaft.

8. In a vehicle transmission, a pair of aligned shafts, and an overrunning clutch mechanism on one of said shafts operatively engageable with the other of said shafts to provide a one-way driving connection between said shafts, said clutch comprising, a polygonal section formed integrally on said one shaft, a pair of rings mounted on said one shaft, one at each end of said polygonal section, bars extending between said rings, alternate bars having one end integral with one or the other of said rings, rollers inserted between said bars, and a sleeve slidable on said rollers operatively engageable with said other shaft.

9. In a vehicle transmission, a pair of aligned shafts, and an overrunning clutch mechanism on one of said shafts operatively engageable with the other of said shafts to provide a one-way driving connection between said shafts, said clutch comprising, a polygonal section formed integrally on said one shaft, a pair of rings having bearing recesses therein mounted on said one shaft, one at each end of said polygonal section, bars extending between said rings, rollers inserted between said bars having reduced end portions received in the bearing recesses in said rings, and a sleeve slidable on said rollers operatively engageable with said other shaft.

10. In a vehicle transmission, a pair of aligned shafts, and an overrunning clutch mechanism on one of said shafts operatively engageable with the other of said shafts to provide a one-way driving connection between said shafts, said clutch comprising, a polygonal section formed integrally on said one shaft, a pair of rings mounted on said one shaft, one at each end of said polygonal section, bars extending between said rings, dowel pins inserted through aligned bores in said rings and said bars to restrain said rings and bars from rotation relative to each other, rollers inserted between said bars, and a sleeve slidable on said rollers operatively engageable with said other shaft.

11. In a vehicle transmission, a pair of aligned shafts, and an overrunning clutch mechanism on one of said shafts operatively engageable with the other of said shafts to provide a one-way driving connection between said shafts, said clutch comprising, a polygonal section formed integrally on said one shaft, a pair of rings mounted on said one shaft, one at each end of said polygonal section, bars extending between said rings and secured thereto, rollers inserted between said bars, springs between said bars and said rollers to urge said rollers away from said bars in one direction, and a sleeve slidable on said rollers operatively engageable with said other shaft.

12. In a vehicle transmission, a pair of aligned shafts, one of said shafts having a polygonal section formed thereon, a cage mounted on said polygonal section comprising, a pair of rings, a plurality of bars between said rings, and a roller inserted between each two adjacent bars, a sleeve slidable on said rollers and operatively engageable with said other shaft, and stop means between said cage and said one shaft to restrain said cage from rotation in one direction relative to said one shaft.

13. In a vehicle transmission, a pair of aligned shafts, means for operatively connecting said shafts comprising, a cage member, comprising a pair of rings, bars between said rings to hold said rings in spaced relation relative to each other, dowel pins inserted in aligned bores in said rings and said bars to maintain said cage in an assembled relation, rollers inserted between said bars carried directly on said one shaft, and a sleeve slidable on said rollers and operatively engageable with said other shaft, said rollers being longer than said sleeve.

14. In a vehicle transmission, a drive shaft, a driven shaft, and a countershaft, a set of clutch teeth on said drive shaft, a gear on said countershaft, and an overrunning clutch mechanism on said driven shaft comprising, a polygonal section integrally formed on said driven shaft, a roller carrying cage on said polygonal section, rollers in said cage, and a sleeve having teeth thereon carried directly upon said rollers slidable axially of said driven shaft to selectively engage with said clutch teeth on said drive shaft or with said gear on said countershaft.

15. In a vehicle transmission, a drive shaft, a driven shaft, and an overrunning clutch mechanism mounted on said driven shaft operatively engageable with said drive shaft to provide a one-way drive between said shafts comprising, a polygonal section having rounded edges integrally formed on said driven shaft, a pair of rings, one at each end of said polygonal section, bar members between said rings having rounded inner surfaces bearing upon the rounded edges of said polygonal section, a plurality of rollers one being mounted in each space between each two adjacent bars and bearing on the flat surface of said polygonal section, and a sleeve slidably mounted upon said rollers and operatively engageable with said drive shaft to provide a one-way driving connection between said shafts.

16. In a vehicle transmission, a drive shaft, a driven shaft, and an overrunning clutch mechanism mounted on said driven shaft operatively engageable with said drive shaft to provide a one-way driving connection between said shafts comprising, a polygonal cam section formed on said driven shaft, a pair of rings, one mounted at each end of said polygonal section, bars between said rings and secured thereto, a plurality of rollers one mounted in each space between each two adjacent bars, the outer surfaces of said bars being rounded, and a sleeve having a journal bearing upon the rounded outer surfaces of said bars and slidable on said bars and said rollers to operatively engage said drive shaft.

17. In a vehicle transmission, a drive shaft, a driven shaft, and a countershaft having in combination therewith, a set of clutch teeth on said drive shaft, a gear on said countershaft, and an overrunning clutch mechanism on said driven shaft comprising, an integral polygonal section on said driven shaft, a roller carrying cage mounted on said polygonal section, rollers carried by said cage, and a sleeve having a set of clutch teeth and a set of gear teeth thereon mounted on said rollers and said cage slidable axially of said driven shaft to selectively engage the clutch teeth thereon with the clutch teeth on said drive shaft or the said gear teeth thereon with the gear on said countershaft to provide a one-way drive in two speed ratios between said drive shaft and said driven shaft.

18. In a vehicle transmission, a drive shaft, a driven shaft and a countershaft having in combination therewith, a set of clutch teeth on said drive shaft, a gear on said countershaft, two sets of clutch teeth on said driven shaft, and an overrunning clutch mechanism mounted on said driven shaft between said sets of clutch teeth comprising, a polygonal section formed integrally on said driven shaft, a roller carrying cage mounted on said polygonal section, rollers mounted in said cage, a sleeve having a set of clutch teeth and a set of gear teeth thereon and two spaced sets of clutch teeth interior thereof mounted on said rollers and said cage slidable axially of said driven shaft to selectively engage the clutch teeth on said drive shaft or the gear teeth on said countershaft to provide a one-way drive between said drive shaft and said driven shaft and further slidable upon said driven shaft to engage one or the other set of interior clutch teeth with the respective set of clutch teeth on said driven shaft to provide a two-way drive between said drive shaft and said driven shaft.

GUY M. HARTSOCK.